(12) United States Patent
Bakos et al.

(10) Patent No.: US 6,838,144 B2
(45) Date of Patent: Jan. 4, 2005

(54) DIRECTORY READ INHIBITOR FOR OPTICAL STORAGE MEDIA

(75) Inventors: Yannis Bakos, New York, NY (US); Erik Brynjolfsson, Cambridge, MA (US)

(73) Assignee: FlexPlay Technologies, Inc., Saco, MA (US)

( * ) Notice: Subject to any disclaimer, the term of this patent is extended or adjusted under 35 U.S.C. 154(b) by 0 days.

(21) Appl. No.: 10/649,504

(22) Filed: Aug. 26, 2003

(65) Prior Publication Data

US 2004/0037994 A1 Feb. 26, 2004

Related U.S. Application Data

(63) Continuation of application No. 09/608,328, filed on Jun. 29, 2000, now Pat. No. 6,641,886.
(60) Provisional application No. 60/143,474, filed on Jul. 12, 1999.

(51) Int. Cl.[7] .................................. B32B 3/02
(52) U.S. Cl. ................. 428/64.1; 428/64.4; 430/270.13
(58) Field of Search ............................ 428/64.1, 64.4, 428/64.8, 913; 439/270.13, 495.1, 945; 369/275.1, 283, 288

(56) References Cited

U.S. PATENT DOCUMENTS

| | | | |
|---|---|---|---|
| 4,237,211 A | 12/1980 | Fanselow | 430/338 |
| 4,380,769 A | 4/1983 | Thomas et al. | 346/135.1 |
| 4,452,288 A | 6/1984 | Shaw | 144/208 |
| 4,478,768 A | 10/1984 | Takeoka et al. | 264/1.4 |
| 4,527,173 A | 7/1985 | Gupta et al. | 346/135.1 |
| 4,530,706 A | 7/1985 | Jones | 96/117.5 |
| 4,542,288 A | 9/1985 | Drexler | 235/487 |
| 4,578,690 A | 3/1986 | Veillette et al. | 503/212 |
| 4,584,641 A | 4/1986 | Guglielmino | 713/200 |
| 4,636,820 A | 1/1987 | Schmidt et al. | 503/224 |
| 4,677,604 A | 6/1987 | Selby, III et al. | 369/30.27 |
| 4,700,839 A | 10/1987 | Fujii | 206/308.3 |
| 4,720,826 A | 1/1988 | Sugiyama et al. | 369/283 |
| 4,734,796 A | 3/1988 | Grynberg et al. | 360/60 |
| 4,735,839 A | 4/1988 | Sato et al. | 428/64.7 |
| 4,748,316 A | 5/1988 | Dickson | 235/454 |
| 4,785,361 A | 11/1988 | Brotby | 360/60 |
| 4,849,836 A | 7/1989 | Kachikian | 360/60 |
| 4,865,942 A | 9/1989 | Gottschalk et al. | 430/138 |
| 4,866,769 A | 9/1989 | Karp | 705/56 |
| 4,879,704 A | 11/1989 | Takagi et al. | 369/53.21 |
| 4,886,162 A | 12/1989 | Ambrogio | 206/710 |
| 4,933,377 A | 6/1990 | Saeva et al. | 522/31 |
| 4,975,898 A | 12/1990 | Yoshida | 369/100 |
| 4,980,782 A | 12/1990 | Ginkel | 360/60 |
| 5,028,109 A | 7/1991 | Lawandy | 359/328 |
| 5,050,213 A | 9/1991 | Shear | 705/53 |
| 5,053,339 A | 10/1991 | Patel | 436/2 |
| 5,057,947 A | 10/1991 | Shimada | 360/60 |
| 5,162,989 A | 11/1992 | Matsuda | 705/1 |
| 5,183,763 A | 2/1993 | Mallow et al. | 436/106 |
| 5,183,769 A | 2/1993 | Rutter et al. | 438/138 |
| 5,185,233 A | 2/1993 | Santo | 430/270.1 |
| 5,228,440 A | 7/1993 | Chung et al. | 600/338 |

(List continued on next page.)

Primary Examiner—Elizabeth Mulvaney
(74) Attorney, Agent, or Firm—Wilmer Cutler Pickering Hale and Dorr LLP

(57) ABSTRACT

Systems and methods are described for inhibiting the readability of an optical media due to changes in a pseudo-reflective material that composes the optical media after the optical media has been exposed to air for a predetermined time. An optical media includes a data encoded component. At least a fraction of the data encoded component transforms from a substantially optically reflective state to a substantially optically non-reflective state as at-least-in-part a function of time from an initializing event. The systems and methods provide advantages because of low cost, limited content lifetime, avoidance of rental returns and minimum changes to existing manufacturing processes.

8 Claims, 2 Drawing Sheets

U.S. PATENT DOCUMENTS

| | | | |
|---|---|---|---|
| 5,267,311 A | 11/1993 | Bakhoum | 705/56 |
| 5,293,422 A | 3/1994 | Loiacono | 713/200 |
| 5,311,494 A | 5/1994 | Sugita et al. | 369/100 |
| 5,322,747 A | 6/1994 | Hugle | 430/1 |
| 5,336,531 A | 8/1994 | Nakayama et al. | 427/510 |
| 5,346,654 A | 9/1994 | Kodaka et al. | 264/1.33 |
| 5,370,970 A | 12/1994 | Tanaka et al. | 430/270.21 |
| 5,371,792 A | 12/1994 | Asai et al. | 705/59 |
| 5,373,499 A | 12/1994 | Imaino et al. | 369/275.4 |
| 5,384,221 A | 1/1995 | Savant et al. | 430/19 |
| 5,400,319 A | 3/1995 | Fite | 369/275.5 |
| 5,412,718 A | 5/1995 | Narasimhalu et al. | 705/51 |
| 5,418,852 A | 5/1995 | Itami et al. | 705/57 |
| 5,426,625 A | 6/1995 | Bui et al. | 369/44.32 |
| 5,432,647 A | 7/1995 | Tateishi | 360/60 |
| 5,448,551 A | 9/1995 | Miyagawa et al. | 369/271 |
| 5,453,968 A | 9/1995 | Veldhuis et al. | 369/47.12 |
| 5,461,239 A | 10/1995 | Atherton | 250/566 |
| 5,473,584 A | 12/1995 | Oshima | 369/47.11 |
| 5,507,947 A | 4/1996 | Kriegl | 210/365 |
| 5,510,163 A | 4/1996 | Sullivan et al. | 428/64.1 |
| 5,513,169 A | 4/1996 | Fite et al. | 369/272 |
| 5,513,260 A | 4/1996 | Ryan | 380/200 |
| 5,538,773 A | 7/1996 | Kondo | 428/64.1 |
| 5,570,379 A | 10/1996 | Sasaki | 714/775 |
| 5,572,589 A | 11/1996 | Waters et al. | 705/58 |
| 5,574,787 A | 11/1996 | Ryan | 380/201 |
| 5,582,434 A | 12/1996 | Skov et al. | 283/81 |
| 5,587,984 A | 12/1996 | Owa et al. | 369/103 |
| 5,592,454 A | 1/1997 | Tobita et al. | 369/53.36 |
| 5,598,399 A | 1/1997 | Ogihara et al. | 369/275.2 |
| 5,608,717 A | 3/1997 | Ito et al. | 369/275.3 |
| 5,629,914 A | 5/1997 | Clark et al. | 369/59.17 |
| 5,636,096 A | 6/1997 | Mardirossian | 360/133 |
| 5,636,292 A | 6/1997 | Rhoads | 382/232 |
| 5,644,566 A | 7/1997 | Nakayama et al. | 369/275.2 |
| 5,646,920 A | 7/1997 | Raczynski | 369/41.01 |
| 5,661,703 A | 8/1997 | Moribe et al. | 369/14 |
| 5,671,202 A | 9/1997 | Brownstein et al. | 369/53.22 |
| 5,680,383 A | 10/1997 | Clark et al. | 369/47.17 |
| 5,681,633 A | 10/1997 | Onagi et al. | 428/64.3 |
| 5,692,914 A | 12/1997 | Mitani et al. | 439/131 |
| 5,776,573 A | 7/1998 | Trotter et al. | 428/64.4 |
| 5,815,484 A * | 9/1998 | Smith et al. | 369/275.1 |
| 5,846,836 A | 12/1998 | Mallow | 436/169 |
| 5,935,673 A | 8/1999 | Mueller | 428/64.1 |
| 5,963,536 A | 10/1999 | Vasic et al. | 369/275.3 |
| 6,011,772 A * | 1/2000 | Rollhaus et al. | 369/286 |
| 6,038,207 A | 3/2000 | Wachi | 369/275.1 |
| 6,083,667 A | 7/2000 | Nishizawa | 430/321 |
| 6,087,075 A | 7/2000 | Kler et al. | 430/321 |
| 6,103,141 A | 8/2000 | Incorvia et al. | 252/194 |
| 6,161,106 A | 12/2000 | Dailey et al. | 707/102 |
| 6,228,440 B1 | 5/2001 | Dailey et al. | 428/1.1 |
| 6,309,496 B1 | 10/2001 | Van Hoof | 156/230 |
| 6,338,933 B1 | 1/2002 | Lawandy et al. | 430/270.1 |
| 6,340,555 B1 | 1/2002 | Miyamoto et al. | 430/270.13 |
| 6,343,063 B1 | 1/2002 | Rollhaus et al. | 369/286 |
| 6,349,823 B1 | 2/2002 | Innis | 206/308.1 |
| 6,434,109 B2 | 8/2002 | Rollhaus et al. | 369/286 |
| 6,511,728 B1 | 1/2003 | Bakos et al. | 428/64.1 |
| 6,641,886 B1 * | 11/2003 | Bakos et al. | 428/64.1 |
| 2002/0102499 A1 * | 8/2002 | Krieg-Kowald | 430/321 |
| 2003/0123380 A1 * | 7/2003 | Waldman et al. | 369/275.4 |
| 2003/0213710 A1 * | 11/2003 | Thompson et al. | 206/308.1 |
| 2004/0008613 A1 * | 1/2004 | Beckwith et al. | 369/291 |
| 2004/0022986 A1 * | 2/2004 | van de Grampel et al. | 428/64.4 |

* cited by examiner

DIRECTORY READ INHIBITOR FOR OPTICAL STORAGE MEDIA

RELATIONSHIP TO CO-PENDING APPLICATIONS

This application claims priority under 35 U.S.C. 119(e) to Provisional Application Ser. No. 60/143,474, filed Jul. 12, 1999. This application is related to International Application Serial No. PCT/US00/07961, filed Mar. 23, 2000; Provisional Application Ser. No. 60/125,927, filed Mar. 23, 1999; Provisional Application Ser. No. 60/128,197, filed Apr. 7, 1999; U.S. application Ser. No. 09/507,490, filed Feb. 18, 2000; and U.S. application Ser. No. 09/507,224, filed Feb. 18, 2000. Each of the above-identified applications is incorporated herein by reference in its entirety.

BACKGROUND OF THE INVENTION

1. Field of the Invention

The invention relates generally to the field of optical media. More particularly, the invention relates to time sensitive disposable optical media.

2. Discussion of the Related Art

Optical disks such as CDs and DVDs are sold and rented to consumers for use at home. The content of the optical disks may be music, movies, software or data. Unfortunately, the purchase of CDs and DVDs can be expensive. The cost is associated not primarily with the manufacturing cost of the optical disks, but with the value of the information, such as movies or software, encoded on the disks. Content providers, such as movie studios or software companies, do not want to sell at a low cost copies of their material that will have a long lifetime in the marketplace. Rentals of CDs and DVDs enable consumers to access the information at a lower cost, but the need to return the rentals on time is inconvenient. It would be desirable to have an optical media (e.g., disk) that the user could purchase at a low cost, would address the concerns of the content providers about lifetime of their content in the marketplace, and which would not have the disadvantage of having to be returned, as is the case with videotape movie rentals today. It would also be desirable to manufacture such an optical disk at low cost and with minimum changes to existing optical disk manufacturing processes.

CDs and DVDs are generally manufactured according to the following process. This information was downloaded from the web site of Disctronics Manufacturing (UK) Ltd., Southwater Business Park, Southwater, West Sussex, England on Jan. 26, 1999, and has been slightly edited.

3. CD Mastering

Mastering of CDs and CD-ROMs is a complex process needed to create a stamper (used to mould the CDs) from the premastered data. The processes are carried out in a class 1,000 clean room. Operators wear special clothing including face masks and footwear to minimize any particles.

4. Glass Master Preparation

Glass Master Preparation of the 240 cm diameter 6 mm thick glass master starts by stripping the old photo resist from its surface (since the glass blanks can be recycled). This is followed by cleaning and final washing using de-ionized water. The blank master is then dried carefully ready for the next stage.

The surface of the clean glass master is then coated with a primer and then a photo resist layer 140 to 150 microns thick by spin coating. The thickness should be matched to the molding cycle time. Shorter cycle times imply a thicker resist layer to ensure good pit geometry. The uniformity of the layer is measured with an infra red laser.

The photo resist coated glass master is then baked at about 80° C. for 30 minutes. This hardens the photo resist layer ready for exposing by laser light.

(a) Laser Beam Recording

A Laser Beam Recorder (LBR) is used to expose the photoresist layer on the glass master where the final pits are required.

This is carried out in a class 100 controlled environment using a high power gas laser directly from the premastered source audio or CD-ROM data. The laser can be blue, violet or (for DVD and CD mastering) ultra violet. The laser beam is modulated to expose the photoresist where pits should be while the glass master spins at exactly the correct linear velocity and is moved gradually and smoothly to maintain the correct track pitch and linear velocity.

The LBR is controlled by a PC based system which formats the data from the source CD, U-matic or Exabyte tape with the CIRC error protection and EFM modulation. If an error occurs which cannot be corrected during mastering the controller will abort recording.

Speed of laser beam recording depends on the machine and input media. At one time when every CD was audio, U-matic was the only media used and only allow single speed mastering. Other newer media allow faster mastering up to 4 times, with even faster speeds possible. The following table summarizes the mastering speeds for different media.

| Input | Media Speed | Comments |
| --- | --- | --- |
| U-matic (1630) | 1x | Still in use but is gradually being phased out. Audio data is often transferred offline to a faster format before mastering |
| DAT | 1x | Not a preferred format for mastering |
| CD | 4x | Faster if LBR capable |
| CD-R | 4x | Depends on quality of CD-R media used and speed of LBR |
| 8 mm Exabyte 8500 | 2.8x | Max speed of Exabyte |
| 8 mm Eliant 820 | 4x | Faster if LBR capable |
| Hard disk | 4x | Faster if LBR capable |

The absolute limit of speed is dictated by the robustness of the glass. For 240 mm glass plates, the practical limit is around 6×for CD mastering.

Network mastering is a new development whereby the data content of Exabytes, CDs etc (containing the audio or other data) is transferred to a server and mastering carried out from this data (which can be checked prior to mastering) via a high speed network. Several LBRs can be connected to the network and mastering jobs can be scheduled in advance. The result is higher speed, more reliable mastering.

(b) Development & Metallization

The exposed photoresist surface is developed to remove the photoresist exposed by the laser and therefore create pits in the surface. These pits should extend right through the photoresist to the glass underneath to achieve good pit geometries as specified in the Red Book. The glass itself is unaffected by this process and acts merely as a carrier for the photoresist.

The active surface (i.e. containing pits) of the developed glass master is then metallized either with nickel or nickel alloy created by sputtering or with silver by evaporation. If nickel or nickel alloy is used this becomes part of the Father which is created by electroforming so the pit geometry is maintained. If silver is used, the nickel Father is grown on top of the silver resulting in some distortion of the pit shapes, but this is not usually enough seriously to impair the resultant pits.

(c) Electroforming

This involves creating nickel fathers, mothers and stampers by electroforming in a class 1000 clean room environment.

The father is electroformed from the metallized glass master and then the surface containing the 'bumps' is oxidized ready for the next stage. (This allows the mother to be separated from the father).

The mother is then electroformed from the father and is an essential intermediate stage from which the stamper(s) are then electroformed in a similar way.

After the mother has been created, the father can then be used as a stamper. Only mothers are needed for subsequent stampers. Additional stampers are created for long runs of CDs.

The photoresist on the glass master is then removed and the glass cleaned ready to be used again. If silver is used, it is recovered and recycled.

(d) Stamper Finishing

When the stamper has been electroformed from the mother, it requires finishing before any discs can be replicated from it.

Each stamper is checked visually, the back polished, it is punched to the required outside diameter, a hole accurately punched in the center and finally it is checked on a stamper player before being fitted to the press.

Stamper finishing is an important stage as it will affect the quality of the final disc. The center hole must be accurately cut to avoid eccentricity which could affect the playability of CD-ROMs using modern high speed CD-ROM drives. Also the stamper thickness must be uniform to avoid unbalance problems in the finished discs.

Finished stampers are stored in protective plastic packages ready to be fitted to a molding machine.

5. CD Replication & Printing

CD Replication Overview

Compact Discs, whether audio or CD-ROM, are manufactured in the same way using the following processes:

Injection molding of the clear polycarbonate discs using a hydraulic press.

Metalising to create an aluminum reflective surface

Lacquering to protect the back of the reflective surface

Printing of the disc label on top of the lacquer.

(a) Replication Lines

The replication of CDs in the past has been carried out using batch processes where each stage of the process uses a different machine. In the last few years integrated replication lines have become the norm. Examples of such machines are:

Single-Line

A complete replication line comprising molding machine, metallizer, lacquer unit, printer (normally 3 color) and inspection. Good and bad discs are transferred to different spindles. Finished discs are removed on spindles for packing.

An alternative to this does not include a printer. This allows a new job to continue without being stopped while the printer is being setup.

Dual-Line

A replication line comprising two molding machines, metallizer, lacquer unit and inspection. This provides a better match between molding machine and downstream equipment cycle times and is currently the most flexible solution. Each molding machine can run different titles, the discs being separated after inspection and placed on different spindles. Also called Duoline.

(b) Injection Molding

Optical grade polycarbonate is 'baked' to remove any moisture and is injection molded in a high pressure molding machine (press) using the stamper mounted in the mould fixed to the press. This mould is in two parts and provides a cavity which ensures that perfectly molded discs are produced with the correct dimensions every time. One half of the mould contains the stamper while the other half contains the mirror block to ensure a smooth surface.

The hydraulic press applies a force to the two halves of the mould which are closed. Molten polycarbonate is then injected into the cavity and held in place by the applied pressure while the disc cools and solidifies. Pressed discs, after cooling, are transferred by robot arms to a spindle for the next stage in the process.

Successful molding of CDs which meet the CD specification, require stable processes with the machines setup correctly. Molding parameters which can affect the resultant CD include stamper geometry, mould temperature, polycarbonate temperature, compression force and cycle time.

Cycle times for injection molding have decreased substantially from over 10 seconds some 10 years ago to under 4 seconds for the latest presses and moulds. Cycle times of under 3 seconds are also becoming possible.

(c) Metallizing

The polycarbonate discs after molding are transparent. In order that the laser can read the pits they need to be covered by a mirror surface to reflect the laser light.

The next stage is therefore to metalize the active surface of each disc with aluminum by sputtering. Sputtering requires the transparent polycarbonate discs to be transferred to the sputtering chamber which is then quickly evacuated of air and filled with argon gas. The argon ions are attracted to the aluminum target by the use of a high voltage. As the ions strike the target, particles of aluminum are ejected and are deposited onto the CD surface.

Modern metalizers are capable of cycle times of under 2 seconds allowing them to be used in duolines where one metallizer can handle the output from two molding machines. The fastest metallizers can achieve cycle times of 1.5 seconds.

(d) Lacquering

The back of the aluminum layer is protected by a lacquer which is spread as a liquid evenly across the surface of the disc by spin coating. The centrifugal force created by spinning the disc ensures that the lacquer covers the whole disc in an even layer.

It is important that the lacquer overlaps the aluminum therefore sealing it from the elements. If left exposed, aluminum will start to oxidize within a few days.

The lacquer is cured by ultra-violet (UV) light producing a hard protective surface. The discs are then ready for printing.

Lacquering involves two steps in the spin-coating process, lacquer deposition and spin-off. Cycle times of under 2 seconds are normally achieved by either splitting the two steps into two stations or using two spin coating stations.

(e) Label Printing

The upper surface of a finished disc is printed with up to five colors by a flat silk screen process. Each color requires a different screen created from label films produced as color separations from the artwork. Each color is printed using a squeegee which pushes the ink through the mesh of the screen on to the disc surface. The inks are then cured using UV light to produce a durable surface.

For picture discs five colors are needed. These are white for the base, plus cyan, magenta, yellow and black (CMYK). Very high quality printing can be achieved using modern printing machines, which are capable of speeds of 70 discs per minute or faster.

Automatic checks are carried out during this stage to ensure that all discs being printed carry the correct catalogue number which is placed on the disc hub during mastering.

6. DVD Manufacture

DVD discs are more difficult to manufacture than CDs, requiring new, purpose designed equipment rather than upgraded equipment. DVD discs are different from CDs in the following ways:

Shallower pits and smaller pit size

Smaller track pitch and tighter tolerances

Higher mastering speeds, both in angular and linear velocity and data rate

New data formatting requirements

Thinner disc substrates to mould

Tighter tolerances on tilt and jitter in particular

Additional bonding stage

Dual layer and double sided options (a) DVD Mastering

The differences between DVD and CD means that much of the mastering process for DVD needs new equipment including improved glass master preparation, laser beam recording and developing. The photo-resist layer should, ideally be about 120 nm in thickness (instead of 140 nm for CD) but successful mastering using the same thickness as for CDs is possible. Any defects or variations in thickness of this layer must be kept very small. Laser beam recording requires a smaller spot size, higher numerical aperture and tighter tolerances than for CDs. Many LBRs designed for DVD mastering use a UV laser (instead of the blue or violet laser used for CDs). To handle CD and DVD mastering, it is necessary to change the numerical aperture from 0.6 for CD to 0.9 for DVD mastering.

DVD data is formatted differently from CDs and requires new formatting hardware/software to handle the RSPC error correction, 8 to 16 modulation and the higher channel data rate.

Stamper finishing requires more care than for CDs, since tilt (variations in flatness of the final disc) is critical for DVD.

DVD-9 (dual layer) discs require the upper layer (layer 1) to be mastered with the turntable rotating in the reverse direction. Also, the direction of writing will be either from the inside to outside (parallel track) or outside to inside (opposite track), depending on the application requirements.

CSS (Content Scrambling System) copy protection is carried out at the mastering stage. The data on DLT is combined with the encrypted keys and the audio and video data scrambled using the keys which are hidden on the DVD disc.

(b) DVD Replication

DVD-5 and DVD-10 were the first discs to be manufactured. DVD-9 has proved to be considerably more difficult and there is a shortage in manufacturing capacity for these dual layer discs. All DVD discs comprise two substrates each 0.6 mm thick and molded separately.

For DVD-5 discs, the active substrate is metallized and then bonded with the blank, non-metallized substrate.

For DVD-10, both substrates are metallized

For DVD-9 discs two metalization layers are required, one being semi-reflective, using gold or silicon. Parameters such as tilt, bonding layer transparency etc are more severe for DVD-9. Also the layer 1 aluminum layer must be uniform in thickness to avoid jitter.

DVD molding is similar to CD molding but with some important differences.

Two pressings are needed for each final DVD disc

Each half disc (substrate) is 0.6 mm thick instead of 1.2 mm

The thinner disc also requires different molding parameters, such as a shorter injection time and higher mould temperature.

In general, new or redesigned mounding machines are needed for DVD.

(c) DVD Bonding

Bonding is one of the most difficult parts of the process. There are a number of possible solutions.

Hot melt bonding is the method used for Laserdiscs where the two substrates just need to be glued together. It is also suitable for single layer (single or double sided) DVDs. The process is simple and relatively inexpensive.

Radical UV Cured bonding is suitable for dual layer discs because it is transparent. It involves coating one or both of the substrates with a UV cured resin similar to normal lacquer.

Cationic UV Bonding involves screen printing the resin over both substrates, curing each with UV light and then pushing the discs together. This method is not suitable for dual layer discs as the resin used is opaque.

Disctronics use Radical UV Cured bonding which is compatible with all DVD formats. DVD-9 bonding is particularly difficult as the bonding layer must be of uniform thickness within close tolerances be optically transparent with no defects such as bubbles not introduce tilt outside the DVD specification (d) DVD Disc Finishing Finishing comprises label printing, for which there are a number of options, and adding the Burst Cutting Area.

| Printing options | DVD 5 | DVD 9 | DVD 10 |
| --- | --- | --- | --- |
| Normal printing on upper surface Of disc (like CDs) | Yes | Yes | No |
| Printing on inside surface of blank substrate to give smooth 'glossy' effect | Yes | No | No |
| Pit Art where a holograph like Image is molded into the blank Substrate | Yes | No | No |
| Printing on both sides but only Within hub area | — | — | Yes |

Burst Cutting Area (BCA) is an annular area within the disc hub where a bar code can be written for additional information such as serial numbers.

DVD Quality Assurance

DVD inspection and testing requires the use of some different techniques, new parameters to be tested and new readers.

DVD glass mastering must be checked using a DVD stamper player to check the stamper prior to replication.

DVD inspection is similar to CD inspection but includes tilt. Discs must be inspected after bonding as this stage can introduce tilt and other defects. DVD-10 discs need inspection of both top and bottom of each disc.

DVD bit verification needs new equipment to read the data.

DVD measurements again need new equipment plus new and modified tests.

7. CD Packaging

There is a wide range of packaging available for audio CDs and CD-ROMs

Jewel case (the most common) comprises a transparent plastic case with hinged lid, a plastic tray, inlay card and booklet.

Slimline cases, a slimmer version with no tray, for audio singles.

Card wallets and many other cases available.

A range of outer packaging is used particularly for CD-ROM discs e.g. to hold a printed manual.

(a) Machine Packing

Discs are packed in standard jewel or slimlines cases with paper parts by automated machines and overwrapped and packed into boxes as required.

The machine automatically takes each case and opens it ready for the disc to be inserted.

A robot arm transfers the printed discs from spindles and places them in the opened cases.

Booklets are fed to the machine by another robot arm and placed in the jewel cases. Some machines are capable of handling two booklets per CD.

The packaged CD can have stickers automatically added and, optionally, can be over-wrapped.

Machines operate at speeds up to 100 CDs per minute or more. For smooth operation at these speeds it is essential that cases and paper parts adhere to the specified dimensions and other physical properties.

U.S. Pat. No. 5,815,484 to Smith, et al. issued on Sep. 29, 1998 discloses a composition and method for meeting the needs stated in the Utility section above.

To quote Smith et al., the currently used optical disk systems operate as follows:

In a typical optical disk for use in a computer's optical readout system, data is stored as a series of lands and pits. This is accomplished by stamping along spiral tracks on a transparent plastic disk, overlaying this with a reflective coating, and thereafter superimposing a protective layer over this coating. Light from a semi-conductor laser is directed toward the lands and pits from below and the reflected light impinges upon a photodetector which converts the presence or absence of the pits into a binary electrical signal. Because the focused laser spot is so minute, the amount of information that can be stored onto the surface of the disk is immense. Adjacent tracks need only be spaced apart by approximately 1.6 microns and, hence, approximately 40,000 tracks may be available on a conventional 120 mm diameter (5 inch) optical disk. The electrical signals delivered to the optical readout system correspond to the magnitude of reflected light which either increases or decreases due to interference and/or diffraction by the preformatted data structures.

Smith et al accomplish the goals stated above by placing an additional layer over the protective layer. Again, quoting Smith:

More particularly, an optical disk is provided which is adapted for use in an optical readout system of a computer that includes a light source operative to produce an interrogating beam of light for reading data structures. Broadly, the optical disk according to the present invention includes a substrate and a metallic layer encoded with information stored as a plurality of data structures that are readable by the interrogating beam of light. The substrate is disposed in a confronting relationship with the metallic layer, and a film of a reactive compound is superimposed over at least some of these data structures. The reactive compound is selected to be of a type which is operative to change physical characteristics in response to a selected stimulus, thereby to affect readability of the data by the interrogating beam.

The reactive compound is disposed between the light source's interrogating beam and the metallic layer. This reactive compound may be interposed between the substrate and the metallic layer and have a thickness in a range of 0.1–10 microns, and preferably 1–5 microns. Alternatively, it may be disposed on an outer surface of the substrate. The metallic layer is preferably contoured to include a sequence of pits and lands which define the plurality of data structures, with the reactive compound superimposed over at least some of these pits and lands.

The selected stimulus to which the reactive compound responds is selected to be either visible light, infrared light, an ambient environment containing light and oxygen, or simply air. Where the stimulus is light alone, the reactive compound may be a photoreactive material and preferably one selected from a spiropyran class of photochromic compounds—for example, 6-nitro-1'3'3'-trimethylspiro-(2H-1benzothiopyran-2,2'-indoline), or 6-nitro-1-S-BIPS for short, and other related compounds.

Where the stimulus is a combination of light and oxygen, the reactive compound would therefore be photoreactive with oxygen and preferably operate to change its physical characteristics in response to an interrogating beam of light having a wavelength of approximately 650 nanometers (nm), which is encountered with digital versatile disk (DVD) readers.

Where the environmental stimulus is simply air, the reactive compound may be one which is operative after an accumulated duration of time to oxidize and alter an optical characteristic thereof. For example, such a reactive compound would change from an optically transparent condition to an optically opaque condition wherein it absorbs light having a wavelength within a desired range. This wavelength could be either 650 nanometers (nm), as discussed above, but may also be approximately 780 nanometers (nm). The oxidizing reactive compound may be selected from a group of dyes consisting of methylene blue, brilliant cresyl blue, basic blue 3 and toluidine blue 0.

Smith et al also teach packaging of the disk in an inert environment:

For example, such an optical disk would preferably be contained in a package in the form of an aluminum bag coated with polyethylene. Within the hermetic packaging would be an inert gaseous environment, such as argon or dry nitrogen.

Heretofore, the requirements of low cost, limited content lifetime, avoidance of rental returns and minimum changes to existing manufacturing precesses referred to above have not been fully met. What is needed is a solution that simultaneously addresses all of these requirements. The invention is directed to meeting these requirements, among others.

SUMMARY OF THE INVENTION

A goal of the invention is to simultaneously satisfy the above-discussed requirements of low cost, limited content lifetime, avoidance of rental returns and minimum changes to existing manufacturing processes which, in the case of the prior art, are not simultaneously satisfied.

One embodiment of the invention is based on an optical disk, comprising: a substrate; a metal layer coupled to said substrate; and a lacquer coupled to said metal layer, wherein optical properties of said substrate change upon an exposure of said substrate to air, said exposure degrading readability of data recorded on said optical disk. Another embodiment of the invention is based on a package containing an optical disk, said optical disk comprising: a substrate, a metal layer coupled to said substrate; and a lacquer coupled to said metal layer, wherein opening said package triggers a process that changes optical properties of said substrate, thereby degrading an ability to read data recorded on said optical disk.

Another embodiment of the invention is based on an optical disk, comprising: a substrate; a metal layer coupled to said substrate; and a lacquer coupled to said metal layer, wherein at least one member selected from the group consisting of said substrate and said lacquer permit controlled exposure of said metal layer to air, thereby degrading readability of data recorded on said optical disk. Another embodiment of the invention is based on a package containing an optical disk, said optical disk comprising: a substrate, a metal layer coupled to said substrate; and a lacquer coupled to said metal layer, wherein opening said package triggers a process that changes reflective properties of said metal layer, thereby degrading an ability to read data recorded on said optical disk.

In improvement to Smith et al, we have recognized that the use of one or more extra layers on the disk may be augmented with additional techniques to achieve the required results. Furthermore, in contrast to Smith et al, we have recognized that for optical disks containing a "directory" or "table of contents" area, it is advantageous to disable said directory area rather than the entire surface of the optical disk. Furthermore, in contrast to Smith et al, we have recognized that a change in the physical structure of the disk, such as warping or enlargement of the central playing hole, can be used to render the disk unplayable, rather than a change in the disk's optical properties. Finally, in addition to the mechanisms identified by Smith et al, we have invented new mechanisms to trigger the process that inhibits playing the disk, such as a user action or the centrifugal force resulting from playing the disk. In one embodiment, our invention consists of a "trench" or set of pores over the table of contents area is filled with a material that turns opaque or cloudy upon exposure to oxygen or other substances in the environment. Similarly, removal of the disk from a controlled environment (e.g., inside the packaging) could gradually render the disk unplayable. For instance, at a coating or substrate might be transparent in a hydrogen environment but gradually become opaque or cloudy in most or all other environments including normal air.

We define the "substrate" to be the one or more layers through which the laser light passes before impinging on the metal layer. Currently the substrate layer is polycarbonate or PMMA, but other materials known to those skilled in the art may be used.

We define the "lacquer" to be the layer or layers not in the path of the laser light during the process of reading data from the disk. One or more of these layers may be composed a material identical or similar to the one used for the substrate. The laser light is not intended to pass through the lacquer. Typically a one-sided disk (such as a CD or a DVD-5) will have a reflective metal layer between the substrate and the lacquer. In a two-sided disk (such as a DVD-10), the lacquer will typically include a layer binding together the two sides of the disk.

One aspect of our invention consists of attacking solely, primarily or first the table of contents (or directory) information on an optical disk. This could be achieved by several approaches, such as a coating, modifying the properties of the substrate, or damaging the metal layer. Benefits include higher manufacturability because a smaller part of the disk may need to be rendered inoperable, and more abrupt deterioration, as instead of deteriorating parts of the video content on a DVD, possibly in a gradual process, attacking the table of contents will prevent the player from accessing entire sections of the video content, and render the disk unplayable in a relatively sharp time frame. This is likely to be preferable to having an extended period during which the disk is playable, but not at full quality. It should be noted that because of the much stronger error correction in the table of contents, previous approaches such as Smith et al, would likely result in the table of contents failing last. Our invention recognizes, however, the benefit of having the table of contents fail first. In order to make the table of contents (or any other part of the disk) more vulnerable the disk could be mastered with a lower level of error correction in this region, a small set of errors could be intentionally introduced in mastering or manufacturing, or a substrate or coating could be used which already was less-than-perfectly readable.

In a further improvement to other proposed approaches, an aspect of our invention consists of increasing the thickness of the material that interferes with reading of the optical data. For instance instead of a coating of a few microns, our invention would allow a layer of material up to the thickness of the substrate, possibly reaching all the way to the metal layer. That would facilitate interfering with the reading laser. For example, it would make it easier to absorb or reflect enough laser light to prevent the laser from reading the data on the disk. It would also make it substantially more difficult for a user to defeat this mechanism by polishing off a thin coating, either mechanically or through the use of a solvent. In one embodiment, this invention would consist of pores or trenches of appropriate dimensions that are imprinted on the substrate during the molding process, by using a specially engineered molding plate instead of the standard flat plate ("mirror"). In another embodiment the shape of these pores or trenches would help prevent the reading of data. For example, a trench (or set of pores) with angled walls over the directory area of a DVD could be filled with a material that changes its refractive index upon exposure to the environment, or physically shrinks allowing air, other gases or vacuum to fill in the gap, or expands. In any of these cases, after the change in the filling material occurs, the laser beam may be reflected at the boundary of the trench or its interior, thus being prevented from reliably reading the data on the disk.

In another aspect of our invention, small bubbles, crystals, particles or cracks could form in the coating or substrate, making the data unreadable. For instance a substance (in gas, solid or other state) could gradually precipitate or otherwise separate from other parts of the disk and thereby create interference for the light beam. In addition to potentially being easier to achieve than a uniformly increasing opacity, this approach may more successfully interfere with the readability of the disk.

In another aspect of our invention, user action triggers the process of destroying information. One embodiment would place a cover on the data side of the disk, over the table of contents/directory area, or over the entire area, or over part thereof. The user would need to remove the cover to play the disk. Removal of the cover would trigger the process that renders the disk unreadable. For example, it could expose an oxidizing coating, or would release a substance that starts a chemical reaction affecting the substrate and/or the metal layer. The substance could be released by breaking microcapsules on the cover itself or on the disk. The cover itself might provide the only barrier protecting the coating or the substance from the environment, or it could do so in combination with other means, such as airtight packaging in an inert environment. The cover might be an adhesive label, special printing or other type of barrier.

In another embodiment, a water-soluble opaque substance over the table of contents or the entire surface of the disk would prevent the disk from being played. The user would need to wipe off with a wet cloth this substance, in order to make the disk playable. The water and moisture would then trigger the process that renders the disk unplayable. Other embodiments could require user actions such as heating or cooling the disk, squeezing or shaking, exposing to microwave radiation in a microwave oven, exposure to bright light, exposure to ultraviolet light dipping in water or other substances, wiping or otherwise exposing the disk to some chemical, or removing or changing some component of the disk. The users actions would relatively quickly render the disk (temporarily) playable. However, they would also set in motion a different and effectively irreversible sequence or set of reactions which eventually render the disk unplayable. The advantage of this general strategy is that instead of relying only or primarily on relatively passive environmental conditions to render the disk unplayable, our invention leads the user to take a more drastic action which may provider a sharper starting point for the time period before the disk becomes unplayable and expand the set of reactions and approaches which can be considered.

The disk could be made unplayable without changing its optical properties, by changing its mechanical/physical properties. In one embodiment, a DVD disk consisting of two substrates could be warped by uneven expansion or other physical changes in the two substrates, or by expansion or other physical changes in an adhesive layer, or by expansion or other physical changes in a specially placed layer that changes upon exposure to moisture or content. In another embodiment, the disk might be rendered unplayable through fractures, either because of thereby induced mechanical failure or because of interference of these fractures with the ability of the laser to read the encoded data. In another embodiment, the central hole could be enlarged, possibly as a result of materials that deteriorate either with exposure to the environment or because of the mechanical stresses of playing (for example, DVDs rotate at speeds up to 1600 rpm).

Playing a DVD on a standard player involves rotation at speeds up to 1600 rpm. Multi-speed DVD drives may utilize even higher speeds. This rotation could provide the triggering and/or sustaining mechanism for the process that renders the disk unplayable. For example, rotation at these speeds results in high centrifugal forces, similar to a mini-centrifuge. In one embodiment, these centrifugal forces could trigger the diffusion or mixing of substances that cause the disk to be unplayable. In another embodiment, microcapsules would break when exposed to sustained centrifugal forces, and trigger a reaction resulting in rendering the disk unplayable. For example, binary substances could react to produce an opaque substance interfering with reading of the optical data, or a reactive agent or a catalyst could be released that attacks the metal layer or the substrate. One approach would be to put such substances in small radial, spiraling or circular trenches or tubules in the disk.

These, and other, goals and embodiments of the invention will be better appreciated and understood when considered in conjunction with the following description and the accompanying drawings. It should be understood, however, that the following description, while indicating preferred embodiments of the invention and numerous specific details thereof, is given by way of illustration and not of limitation. Many changes and modifications may be made within the scope of the invention without departing from the spirit thereof, and the invention includes all such modifications.

BRIEF DESCRIPTION OF THE DRAWINGS

A clear conception of the advantages and features constituting the invention, and of the components and operation of model systems provided with the invention, will become more readily apparent by referring to the exemplary, and therefore nonlimiting, embodiments illustrated in the drawings accompanying and forming a part of this specification, wherein like reference characters (if they occur in more than one view) designate the same parts. It should be noted that the features illustrated in the drawings are not necessarily drawn to scale.

DESCRIPTION OF PREFERRED EMBODIMENTS

Figure 1A:
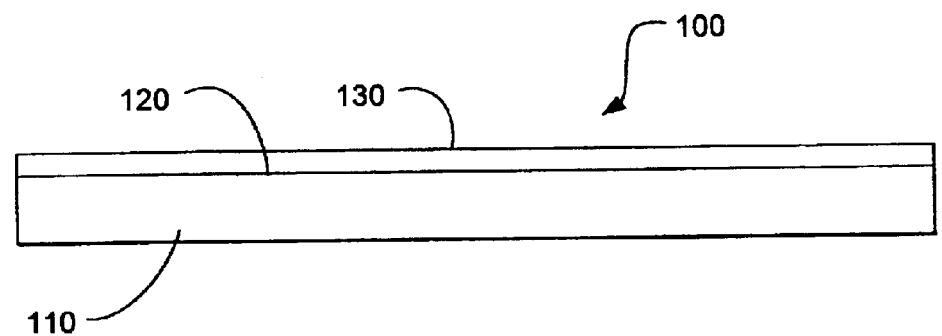
FIGS. 1a–1b illustrate schematic side views of an optical disk, representing an embodiment of the invention.

The invention and the various features and advantageous details thereof are explained more fully with reference to the nonlimiting embodiments that are illustrated in the accompanying drawings and detailed in the following description of preferred embodiments. Descriptions of well known components and processing techniques are omitted so as not to unnecessarily obscure the invention in detail.

The context of the invention includes reading data from an optical media. Optical disks represent a generic class of optical media. The sub-generic class of DVD-ROM can contain any digital information. DVD-Video is based on DVD-ROM standard and also on the standards represented by MPEG-2 and Dolby Digital. The invention can utilize data processing methods that transform signals produced from the data encoded on the optical media so as to actuate interconnected discrete hardware elements; for example, to start, stop and/or actuate other functions of the media reader (device) that is accessing the data on the optical media.

The concept of the invention includes disposable optical media, such as, for example time-sensitive disposable digital video disk (DDVD). A DVD could be manufactured or packaged in such a way that it can only be used for a limited time period or a limited number of uses.

The DVD could react with oxygen in the air so that once it was removed from an air-tight package, the surface would obscure a fraction of the underlying data. For instance, some plastics may be come cloudy, or black.

The DVD could react with other constituents of air such as moisture or other gases so that once it was removed from an air-tight package, the surface would obscure a fraction of the underlying data. Again, some plastics may be come cloudy, or black.

The DVD could react to light, such as the laser light that is used to read data, so that it could not be read again after some number of readings. This could be a photochemical process similar to photography or the clouding of a substance when exposed to light.

The DVD could react to ambient room light so that it could not be read again after some number of readings. Again, this could be a photochemical process similar to photography or the clouding of a substance when exposed to light.

An electrostatic or mechanical reaction could occur when the DVD is removed from the packaging which sets in motion a timed destruction of the data. The effect could be powered by a small battery or simply the energy released when the DVD is removed from the package.

The process of removing the DVD from the packaging or playing it in a device could set off the timing in any other way. For example, removing the DVD from the packaging might break a seal exposing either the data side or the label side of a single-sided DVD to reactants contained within either the DVD or the packaging materials, thus triggering the process that renders the DVD unusable after a certain period of time or a certain number of uses.

The DVD player could actively read some encrypted identifying information from the DVD and refuse to play it again. This could be implemented either by actively modifying the DVD or by storing this information in the player or in a network.

The degradation can be relatively sudden (S-shaped), if possible, so that there would be minimal affect on the data for some initial period, and then a rapid loss of data. For instance, by including in the DVD a finite, controlled quantity of antioxidant along with a substance that reacts to oxygen, it could be possible to initially protect the data, and then when the anti-oxidant was used up, rapidly have the DVD degrade.

The invention can readily apply to related media such as compact discs (CDs), Laser disks, CD-ROMs, tapes, etcetera. Applications of the invention include storage of limited-viewing movies, which could supplant the video rental market. Other applications of the invention include "trial" disks with music, software or other digital information, mail order catalogs for music, videos, software, data, games, etcetera; hybrid disks with some permanent components (e.g., coming attractions), games with limited time for completion, etcetera.

The time during which the data would be useable could range from less than a few seconds to more than several weeks. The time during which the data would be useable could be limited to a single playing, some finite number of uses, or even a random number of uses.

An extra layer on the disk is not required to achieve the desired results. In one embodiment, exposure to the ambient environment will damage the performance of the metal layer.

The term "substrate" is defined herein to be the one or more layers through which the laser light passes before impinging on the metal layer. The substrate can be polycarbonate, but other materials known to those skilled in the art may be used.

The term lacquer is defined herein to be the layer or layers on the back of the disk. One or more of these layers may be composed of a material identical, or similar, to the one used for the substrate. The laser light is not intended to pass through the lacquer. Typically a one-sided disk (such as a CD or a DVD-5) will have a reflective metal layer between the substrate and the lacquer. In a two-sided disk (such as a DVD-10), the lacquer will typically include a layer binding together the two sides of the disk.

In one embodiment, the invention includes an optical disk on which the metallic layer containing the data is not completely protected from the ambient environment. For example, a portion of the surface may deliberately not be coated by the lacquer or substrate. This permits the unprotected portion of the metallic layer to be acted upon by the ambient environment. The reflective metal may react with a component of air. For example, an aluminum layer may be oxidized by the oxygen in air to aluminum oxide. After a period of exposure to the ambient environment the quality of the signal reflected by the metallic layer will degrade, resulting in poor data quality or even the inability to read the data on the disk.

The rate of degradation can be defined by the metal. It is accelerated when the metal is magnesium or silver and is decelerated when the metal is aluminum. If the metal is in electrical contact with a second metal, the degradation is accelerated. For example, contacting of aluminum with silver, gold or copper accelerates the degradation. In general, contacting of magnesium or aluminum with a more noble metal accelerates the degradation of the magnesium or the aluminum layer. When two metals are used, the rate of degradation can be adjusted through the ratio of their exposed areas. When the two different metals are overlapping films, the rate of degradation is also determined by the overlap.

It is not necessary that the entire surface be unprotected. For example, it is sufficient to leave unprotected only key portions of the optical disk that contain data necessary to read the remainder of the disk.

It is possible to control the time required for the metallic layer of the optical disk to degrade by controlling the thickness, quality or composition of the substrate or lacquer. For example, a substrate or lacquer may be chosen such that the flux of oxygen, nitrogen, water or hydrogen sulfide reaching the metallic surface is a function of the thickness of the layer. Alternatively, the materials comprising the substrate or lacquer may be chosen such that layers of equal thickness have different permeabilities to oxygen, water or hydrogen sulfide. In such a way optical disks can be designed to fail at a desired time after exposing them to the destructive environment, e.g., one hour, six hours, 24 hours, 48 hours, 72 hours or one week.

Alternative Embodiment

Another composition that performs a similar function is one in which the substrate itself is modified over time. The modification of the substrate could cause it to change its optical qualities, thereby degrading the signal reaching the reader. These optical qualities could include its index of refraction or its transparency.

Moreover, the modification of the substrate could cause the underlying metal layer to change its optical properties, as described above. In this way, a time-sensitive substrate and/or lacquer could be combined with a reflective layer that becomes non-reflective.

The transparency of a polymer film can be changed by the following: reaction of the film with water; reaction of the film with oxygen; or crystallization of the polymer, meaning increased alignment of polymer molecules in the film.

As an example, a substrate could be chosen that is changed by components in air such as oxygen or water. For example, oxygen could oxidize the substrate, causing a change in its transparency or its index of refraction.

Alternatively, the substrate could be designed to absorb water in the air, causing it to swell and change its optical properties. Another example is that the substrate could change its permeability to oxygen over time, thereby permitting the oxidation of the metallic layer. In the later case, the overall time sensitivity of the optical media could be a function of the properties of both the substrate and/or lacquer and the reflective layer.

The substrate or the metallic layer could also be made sensitive to specific wavelengths of light. Exposure to these wavelengths would cause a change in the optical qualities of the layer, thereby degrading the signal reaching the reader. Examples include photodepolymerization of the substrate; photogeneration of acid; photogeneration of singlet oxygen; and unzipping of the polymers (e.g., fissure of cross linking hydrogen bonds). Incorporation of light-activated catalysts into the substrate or the metallic layer can assist in this process.

Preferably, the data quality of the disk remains high for the intended period of use and then decays rapidly. One method of accomplishing this is to print a layer of metallic silver on the back of the disk, over the lacquer. Upon exposure to air the silver serves as a cathode, on which O2 is reduced; aluminum serves as an anode. Corrosion is fast only if a short develops between the silver and the aluminum layers. The development of the short results from the growth of a silver dendrite through the lacquer.

To grow the dendrite through the lacquer it is desirable to use a lacquer that has some ionic conductivity. Typically the lacquer is a polyacrylate. If the polyacrylate is slightly hydrolyzed, or if it is, for example, a 2-hydroxyethylacrylate copolymer, there will be some ionic conductivity. Preferred are co-polymers of poly(acrylonitrile), or of poly(4-vinylpyridine), or of poly(1-vinylimidazole). All of these should conduct silver, copper or thallium ions ($Ag^+ Cu^+$ or $Tl^+$). Thallium is less preferred due to its toxicity.

The chemical equations are as follows:

Silver is air-oxidized:

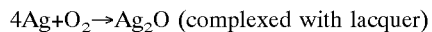
$4Ag + O_2 \rightarrow Ag_2O$ (complexed with lacquer)

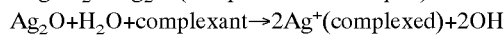
$Ag_2O + H_2O + \text{complexant} \rightarrow 2Ag^+(\text{complexed}) + 2OH$ $Ag^+$ is reduced by aluminum, which is oxidized (if $Ag^+$ is mobile in the lacquer, which is designed to conduct $Ag^+$)

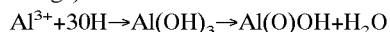
$Al^{3+} + 3OH \rightarrow Al(OH)_3 \rightarrow Al(O)OH + H_2O$

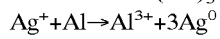
$Ag^+ + Al \rightarrow Al^{3+} + 3Ag^0$

A silver dendrite starts growing from the aluminum to the silver. When the two layers are shorted, the "switch" between a battery's (Al) anode and (Ag) cathode is closed. Corrosion is rapid and catastrophic. One skilled in the art will recognize that other similar metals may be substituted for Al and Ag in this example.

Given a suitable substrate, the aluminum and silver coatings could be sputter deposited. The lacquer could be spin coated.

Another aspect of the invention is a composition comprising a degradable optical disk as described in this section packaged in an enclosure and atmosphere that protects it from the environmental stimulus that causes its failure. For example, the optical disk described above could be packaged in a metallized foil package containing a gas such as carbon dioxide, nitrogen or argon. The pressure of gas(es) in the package can be sub-atmospheric, preferably less than 1 torr. Inert gases such as argon are preferred. This would serve to protect the optical disk from oxygen, water, and/or light of certain wavelengths.

Another aspect of the invention is a method of manufacturing the degradable optical disk described above. The method involves coating the substrate or lacquer described above onto the metallic layer so that it partially or completely covers the disk, so that the optical signal from the disk degrades when exposed to a preselected environmental stimulus.

Another aspect of the invention is a method of manufacturing the degradable optical disk with a process that changes the optical properties of the substrate and/or the reflective properties of the metal layer in a way that can be partially or fully reversed, resulting in a fully or partially reversible loss of the ability to read the data on the optical disk.

Subsequently the disk can be exposed to a "reversing environment" that partially or fully reverses the impact of the previous step. The disk is subsequently packaged in a "preserving environment" (which may be identical to or different from the reversing environment). Opening the package results in a loss of the "preserving environment" and/or exposure to ambient conditions of oxygen, moisture and/or light, which will result in renewed degradation or loss of the ability to read data from the disk within a certain time period. It is preferable that this last degradation of the disk be difficult or impractical to reverse. For example, certain salts could be mixed with the polycarbonate pellets used in injection molding of the substrate. During the process of injection molding, these salts may interact with oxygen, carbon dioxide and/or water to form opaque compounds that modify the optical properties of the substrate. After the steps in the traditional manufacturing process, the optical disks could be chemically reduced in a hydrogen atmosphere, once again rendering the polycarbonate substrate transparent to the reading laser. Subsequently the disks could be packaged in a hydrogen environment. Opening the package would result in the loss of the reducing hydrogen and exposure to atmospheric oxygen, moisture and carbon dioxide, rendering the polycarbonate substrate opaque after a controlled time period.

Another aspect of the invention is a mechanical device which sets in motion a timed destruction of the data when the optical disk is removed from the packaging. In one embodiment, removing the disk from the packaging might break a seal exposing either the data side or the label side of a single-sided disk to reactants contained within either the disk itself or the packaging materials, thus triggering the process that renders the disk unusable after a certain period of time or a certain number of viewings. For example, a reducing gas could be stored in a compartment of the package apart from the disk. The disk comprises a protective layer that prevents oxidation of the underlying substrate or metal. The package is designed such that when the package is opened for the first time a seal is broken and the reducing gas contacts a surface of the disk, thereby causing the protective layer to be destroyed. The substrate or metal layer that had been protected from oxidation by the protective layer would then be susceptible to oxidation by air, as described above.

Alternatively, a timed destruction of the data can be triggered by electric current or charge provided by a small battery, or simply the energy released when the disk is removed from the package. For example, a reversible chromophore could be used. The chromophore is reduced to a colorless-state when the potential is applied. When the potential is removed, the chromophore is gradually regenerated by oxidation by oxygen in air. In the regenerated state the chromophore absorbs light.

Alternatively, a charge storing device such as a small battery built into the packaging material, could provide an electric field that inhibits the reaction that destroys the disk's ability to read data. The process of removing the optical disk from its packaging would then interrupt the inhibiting field, thus triggering the process that destroys the disk's ability to read data. For example, the battery applies a potential to the metal layer which maintains the metal layer in a reduced state. When the potential is removed the metal layer begins to oxidize when contacted with an oxidizer such as oxygen in the air.

Another aspect of the invention is a method of manufacturing the degradable optical disk and packaging it in an enclosure and/or atmosphere that protects it from the environmental stimulus that causes its failure. The invention further comprises controlling the exposure of the finished optical disk to the environmental stimulus that causes its failure during the manufacturing and/or the packaging operations. For example, optical disks manufactured today may sit unpackaged for a substantial amount of time before being packaged. Such a time lag may act to significantly degrade the signal quality of the optical disks of this invention before the disks are even packaged. Therefore, the optical disk should be packaged in the protective enclosure and/or atmosphere within 24 hours of its production, preferably within 8 hours of its production, more preferably within one hour of its production and most preferably within 30 minutes of its production. Stated a different way, the optical disk should be packaged in its protective enclosure and/or atmosphere in a time period of less than 20% and preferably less than 10% of its expected degradation time.

It is also possible to manufacture and/or store the unpackaged optical disk in an environment that does not cause its degradation. Such an environment might be, for example, a nitrogen atmosphere, substantially zero air, or controlled lighting. Such an approach may be less desirable than promptly packaging the disk in a protective enclosure and/or atmosphere due to the high costs associated with these special environments.

Another aspect of the invention is a method of use of the optical disk described above, comprising packaging the disk in an enclosure and/or atmosphere that protects it from the environmental stimulus that causes its failure, then opening the package and exposing it to the environmental stimulus that causes its failure.

It is desirable to have the level of degradation be minimal for some initial period, and then speed up resulting in a rapid degradation of the ability to read data off the optical disk. One method of accomplishing this is the growth of dendrites through the lacquer, as described above. Another means for accomplishing this is to include a finite, controlled quantity of antioxidant along with a substance that reacts with oxygen. The anti-oxidant would protect the data from oxidation reactions until such time as the anti-oxidant was consumed, at which time the disk would rapidly degrade. For example, an organometallic compound that reacts with oxygen can be packaged with the disk to protect the disk from oxidation while in the package. Alternatively, the organometallic compound can be incorporated into the substrate, thus continuing to protect the metal layer for a period of time after the package has been opened.

The term coupled, as used herein, is defined as connected, although not necessarily directly, and not necessarily mechanically. The term substantially, as used herein, is defined as approximately (e.g., preferably within 10% of, more preferably within 1% of, most preferably within 0.1% of).

The particular material used for the substrates can be any substantially transparent material. Polymeric materials are preferred, such as, for example, polycarbonate, acrylic (polymethylmethacralate PMMA) or polyolefine. For the manufacturing operation, it is an advantage to employ a polycarbonate material.

However, the particular material selected for the substrate is not essential to the invention, as long as it provides the described function. Normally, those who make or use the invention will select the best commercially available material based upon the economics of cost and availability, the expected application requirements of the final product, and the demands of the overall manufacturing process.

While not being limited to any particular performance indicator or diagnostic identifier, preferred embodiments of the invention can be identified one at a time by testing for an accurate and precise time-sensitive decay of optical properties. More specifically, both the onset and duration of decay should be predictable. A sudden deterioration (brief duration of decay) is preferred, for example, approximately one hour. For instance, preferred embodiments of the invention can be identified one by one by testing for the presence of a narrow standard distribution of the time from activating event (e.g., exposure to air) to 50% optical deterioration (e.g., 50% loss of transmissivity or 50% loss of reflectivity). Many other optical (e.g., material property) tests are possible.

EXAMPLES

Specific embodiments of the invention will now be further described by the following, nonlimiting examples which will serve to illustrate in some detail various features of significance. The examples are intended merely to facilitate an understanding of ways in which the invention may be practiced and to further enable those of skill in the art to practice the invention. Accordingly, the examples should not be construed as limiting the scope of the invention.

Example 1

Figure 1B:
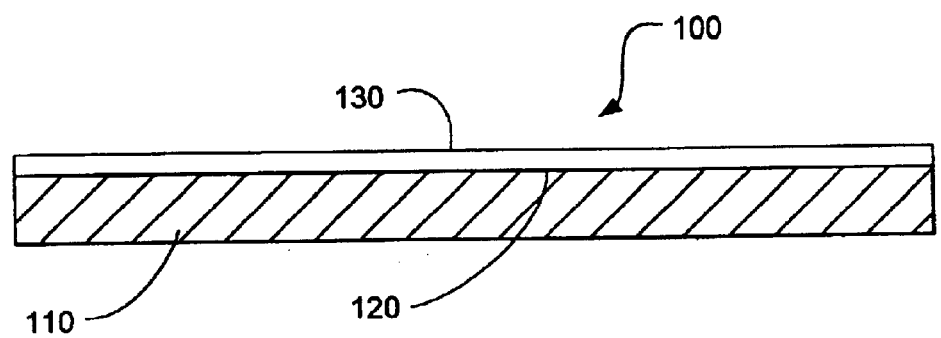

Referring to FIGS. 1a–1b, edge views of an optical disk 100 with a pseudo-transmissive read inhibitor are shown. The optical disk 100 includes a substrate 110, a reflective layer 120 and a lacquer layer 130. FIG. 1a shows the optical disk 100 in a first state wherein the substrate 110 is substantially optically transmissive. FIG. 1b shows the optical disk 100 in a second state wherein the substrate is substantially optically non-transmissive. The transformation from the first state to the second state is at-least-in-part a function of time from an initializing event, in this particular example, the opening of a substantially gas impermeable membrane (not shown) that encloses the optical disk 100 while it is packed, shipped and sold.

Example 2

Figure 2A:
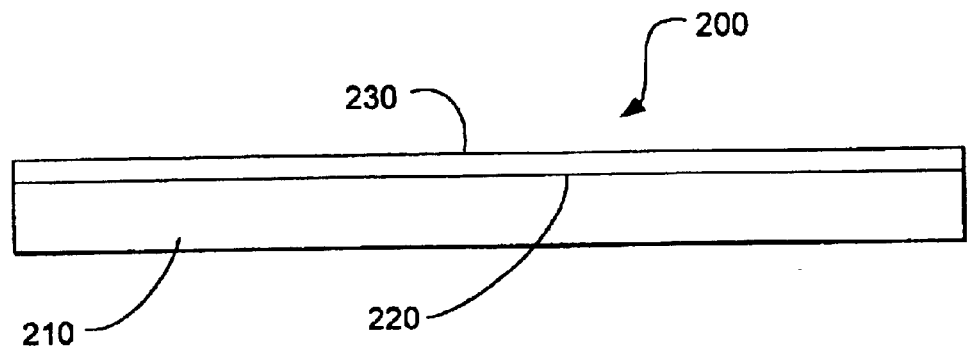
FIGS. 2a–2b illustrate schematic side views of another optical disk, representing another embodiment of the invention.
Figure 2B:
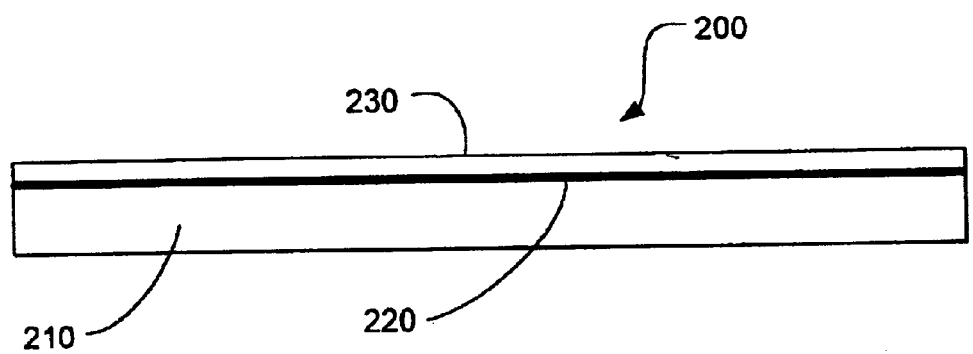

Referring to FIGS. 2a–2b, edge views of an optical disk 200 with a pseudo-reflective read inhibitor are shown. The optical disk 200 includes a substrate 210, a data encoded component 220 and a lacquer layer 230. In this example, the data encoded component 220 is a thin film of metal. FIG. 1a shows the optical disk 200 in a first state wherein the data encoded component 220 is substantially optically reflective. FIG. 1b shows the optical disk 200 in a second state wherein the data encoded component 220 is substantially optically non-reflective. As in the first example, the transformation from the first state to the second state is at-least-in-part a function of time from an initializing event, in this second example, the opening of a substantially air tight laminated polymeric container (not shown) that encloses the optical disk 200 while it is packed, shipped and sold.

Practical Applications of the Invention

A practical application of the invention that has value within the technological arts is time-sensitive optical media. Further, the invention is useful in conjunction with DVD-ROM (such as are used for the purpose of software), or in conjunction with DVD-Audio (such as are used for the purpose of music), or in conjunction with DVD-video (such as are used for the purpose of movies), or the like. There are virtually innumerable uses for the invention, all of which need not be detailed here.

Advantages of the Invention

An optical media with time-sensitive properties, representing an embodiment of the invention, can be cost effective and advantageous for at least the following reasons. The invention allows a low cost retail product. The invention yields a product having the potential of a limited content lifetime. The invention permits the avoidance of rental returns. The invention and minimum changes to existing manufacturing precesses.

All the disclosed embodiments of the invention described herein can be realized and practiced without undue experimentation. Although the best mode of carrying out the invention contemplated by the inventors is disclosed above, practice of the invention is not limited thereto. Accordingly, it will be appreciated by those skilled in the art that the invention may be practiced otherwise than as specifically described herein.

For example, the individual components need not be formed in the disclosed shapes, or assembled in the disclosed configuration, but could be provided in virtually any shape, and assembled in virtually any configuration. Further, the individual components need not be fabricated from the disclosed materials, but could be fabricated from virtually any suitable materials. Further, although the optical media described herein can be a physically separate module, it will be manifest that the optical media may be integrated into the apparatus with which it is associated. Furthermore, all the disclosed elements and features of each disclosed embodiment can be combined with, or substituted for, the disclosed elements and features of every other disclosed embodiment except where such elements or features are mutually exclusive.

It will be manifest that various additions, modifications and rearrangements of the features of the invention may be made without deviating from the spirit and scope of the underlying inventive concept. It is intended that the scope of the invention as defined by the appended claims and their equivalents cover all such additions, modifications, and rearrangements. The appended claims are not to be interpreted as including means-plus-function limitations, unless such a limitation is explicitly recited in a given claim using the phrase "means-for." Expedient embodiments of the invention are differentiated by the appended subclaims.

What is claimed is:

1. An optical media, comprising: a data encoded component, wherein at least a fraction of said data encoded component transforms from a substantiually optically reflective state to a substantially optically non-reflective state as at-least-in-part a function of time from an initializing event, wherein said data encoded component includes a first metal film that includes at least one metal selected from the group consisting of Al, Mg and Ag and further comprising a layer of lacquer coupled to said data encoded component and an exterior metal coating with ionic conductivity coupled to said layer of lacquer, said exterior metal coating included at least one element selected from the group consisting of silver, copper and thallium wherein said layer of lacquer includes at least one copolymer selected from the group consisting of poly (acrylonitrile), poly(4-vinylpyridine) and poly(1-vinylimidiazole).

2. An optical media, comprising: a data encoded component, wherein at least a fraction of said data encoded component transforms from a substantiually optically reflective state to a substantially optically non-reflective state as at-least-in-part a function of time from an initializing event, wherein said data encoded component includes a first metal film that includes at least one metal selected form the group consisting of Al, Mg and Ag and further comprising a layer of lacquer coupled to said data encoded component and an exterior metal coating with ionic conductivity coupled to said layer of lacquer, said exterior metal coating including at least one element selected from the group consisting of silver, copper and thallium wherein said layer of lacuer includes hydrolyzed polyacrylate lacquer.

3. An optical media, comprising: a data encoded component, wherein at least a fraction of said data encoded component transforms from a substantiually optically reflective state to a substantially optically non-reflective state as at-least-in-part a function of time from an initializing event, wherein said data encoded component includes a first metal film that includes at least one metal selected form the group consisting of Al, Mg and Ag and further comprising a layer of lacquer coupled to said data encoded component and an exterior metal coating with ionic conductivity coupled to said layer of lacquer, said exterior metal coating including at least one element selected from the group consisting of silver, copper and thallium wherein said layer of lacquer includes 2-hydroxytheylacrylate copolymer.

4. A method of making an opotical media, comprising:

providing a substrate;

coating a reflective layer on said substrate;

exposing said substrate to a reversing environment to increase optical transmissivity of said substrate; and then exposing said substrate to a preserving environment to maintain optical transmissivity of said substrate.

5. The method of claim 4, wherein said substrate includes polycarbonate and salts mixed with said polycarbonate.

6. The method of claim 5, wherein the salts interact with at least one atmospheric component selected from the group consisting of $O_2$, $CO_2$ and $H_2O$ to form opaque compounds.

7. The method of claim 6, wherein said reversing environment includes hydrogen and said opaque compounds are disassociated by said reversing environment.

8. An optical media made by the method of claim 4.

* * * * *